(12) United States Patent
Krausz et al.

(10) Patent No.: US 9,151,419 B1
(45) Date of Patent: Oct. 6, 2015

(54) PIPE COUPLING WITH SEAL PRESSING DEVICE

(71) Applicants: Eliezer Krausz, Tel Aviv (IL); Avi Chiproot, Kfar-Saba (IL)

(72) Inventors: Eliezer Krausz, Tel Aviv (IL); Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 0 days.

(21) Appl. No.: 14/269,216

(22) Filed: May 5, 2014

(51) Int. Cl.
*F16L 21/00* (2006.01)
*F16L 21/06* (2006.01)
*F16L 21/03* (2006.01)
*F16L 55/00* (2006.01)

(52) U.S. Cl.
CPC ............ *F16L 21/06* (2013.01); *F16L 21/002* (2013.01); *F16L 21/03* (2013.01); *F16L 55/00* (2013.01)

(58) Field of Classification Search
USPC ............ 285/95, 337, 379, 380, 373, 419, 53, 285/37, 123.4–123.9, 123.11–123.13
See application file for complete search history.

(56) References Cited

U.S. PATENT DOCUMENTS

| | | | | |
|---|---|---|---|---|
| 2,377,510 A * | 6/1945 | Newell | | 285/112 |
| 3,570,259 A * | 3/1971 | Thaxton | | 277/553 |
| 4,122,586 A * | 10/1978 | Nothdurft | | 24/277 |
| 4,123,094 A * | 10/1978 | Smitka | | 285/405 |
| 4,267,842 A * | 5/1981 | Archibald | | 606/155 |
| 4,328,981 A * | 5/1982 | Greene et al. | | 285/288.1 |
| 4,813,718 A * | 3/1989 | Matter et al. | | 285/373 |
| 4,852,913 A * | 8/1989 | Brooks | | 285/15 |
| 4,890,863 A * | 1/1990 | Westhoff et al. | | 277/606 |
| 4,966,397 A * | 10/1990 | McKinnon | | 285/197 |
| 5,137,305 A * | 8/1992 | Straub | | 285/112 |
| 5,193,850 A * | 3/1993 | Lombardo | | 281/2 |
| 5,253,901 A * | 10/1993 | Hunter | | 285/424 |
| 5,358,286 A * | 10/1994 | Eaton et al. | | 285/197 |
| 6,213,522 B1 * | 4/2001 | Jacobson et al. | | 285/64 |
| 6,805,359 B2 * | 10/2004 | Neuhaus et al. | | 277/576 |
| 7,360,799 B1 * | 4/2008 | Price | | 285/179 |
| 7,399,005 B2 * | 7/2008 | Rigollet et al. | | 285/407 |
| 7,497,485 B2 * | 3/2009 | An | | 285/419 |
| 8,172,280 B2 * | 5/2012 | Fischer | | 285/424 |
| 8,480,093 B2 * | 7/2013 | Skinner et al. | | 277/616 |
| D697,592 S * | 1/2014 | Hebert | | D23/259 |
| 8,651,532 B2 * | 2/2014 | Felber | | 285/236 |
| 2003/0205899 A1 * | 11/2003 | Bishop et al. | | 285/373 |
| 2004/0100091 A1 * | 5/2004 | Krausz et al. | | 285/15 |
| 2004/0108713 A1 * | 6/2004 | Krausz et al. | | 285/53 |
| 2005/0006853 A1 * | 1/2005 | Neuhaus et al. | | 277/576 |
| 2011/0095520 A1 * | 4/2011 | Krausz et al. | | 285/37 |
| 2012/0018999 A1 * | 1/2012 | Geese et al. | | 285/337 |
| 2012/0299295 A1 * | 11/2012 | Chiproot | | 285/337 |
| 2013/0328305 A1 * | 12/2013 | Chiproot | | 285/337 |
| 2014/0167409 A1 * | 6/2014 | Artsiely et al. | | 285/337 |

* cited by examiner

*Primary Examiner* — Aaron Dunwoody
(74) *Attorney, Agent, or Firm* — Dekel Patent Ltd.; David Klein

(57) ABSTRACT

A seal pressing device for a pipe coupling including a sealing member having an axial length and an outer curved contour pressable against an inner diameter of a seal, the sealing member having an axial row of mounting apertures for receiving therein mechanical fasteners, and at least one winged extension extending from an end of the sealing member bent inwards from the outer curved contour of the sealing member.

5 Claims, 3 Drawing Sheets

PIPE COUPLING WITH SEAL PRESSING DEVICE

CROSS-REFERENCE TO RELATED APPLICATIONS

This application claims priority from and is a continuation of U.S. patent application Ser. No. 12/607,069 filed Oct. 28, 2009, which is incorporated herein by reference.

FIELD OF THE INVENTION

The present invention relates to a coupling for pipes, and particularly to a device for pressing against edges of a seal in a pipe coupling to ensure proper sealing.

BACKGROUND OF THE INVENTION

Many kinds of removable band-type couplings for pipes exist in the art. It is noted that throughout the specification and claims, the term "pipe" encompasses any kind of generally cylindrical object.

For example, one commercially available type of pipe coupling has a seal clamp housing. Clamp members are positioned face to face and a tightening element is tightened to press an annular seal element against the outside of the pipe inserted through the seal clamp housing.

In this type of pipe coupling, the seal has integrally formed rings at opposite ends of its axial length. The pipes that are inserted in the coupling contact these rings. The inner diameter of the rings can be adjusted to accommodate different outer diameters of pipes. The seal has an axial split along its length. The edges of the seal along the split either abut each other or overlap, and are pressed against each other when the coupling is tightened on the pipes. However, the rest of the axial length of the seal between the rings is thinner than the rings and does not contact the outer diameters of the pipes inserted in the coupling. Since the pipes do not contact the seal along most of the split, a problem can possibly occur wherein the edges of the seal along the split are not adequately pressed together to form the desired fluid-tight seal.

SUMMARY OF THE INVENTION

The present invention seeks to provide a device for pressing against edges of a seal in a pipe coupling to ensure proper sealing, as is described more in detail further below.

There is provided in accordance with an embodiment of the present invention a seal pressing device for a pipe coupling including a sealing member having an axial length and an outer curved contour pressable against an inner diameter of a seal, the sealing member having an axial row of mounting apertures for receiving therein mechanical fasteners, and at least one winged extension extending from an end of the sealing member bent inwards from the outer curved contour of the sealing member.

In accordance with an embodiment of the present invention an axial crease is parallel to the row of mounting apertures. The axial crease may be positioned between the row of mounting apertures and the at least one winged extension.

In accordance with an embodiment of the present invention two winged extensions extend from ends of the sealing member on opposite sides of the row of mounting apertures. One of the winged extensions may be closer to the row of mounting apertures than the other winged extension.

BRIEF DESCRIPTION OF THE DRAWINGS

The present invention will be understood and appreciated more fully from the following detailed description, taken in conjunction with the drawings in which.

DETAILED DESCRIPTION OF EXEMPLARY EMBODIMENTS

Figure 1:
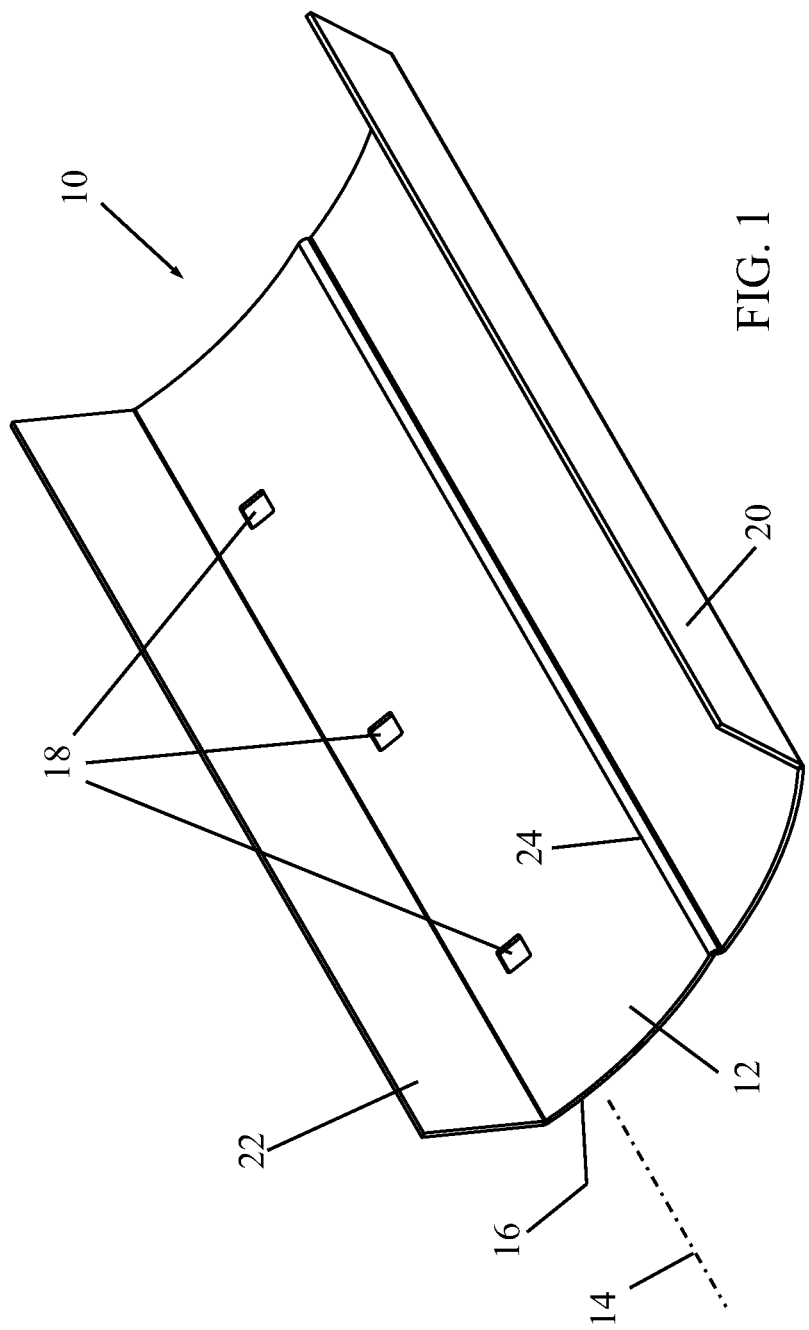
FIG. 1 is a simplified pictorial illustration of a seal pressing device, constructed and operative in accordance with a non-limiting embodiment of the present invention.

Reference is now made to FIG. 1, which illustrates a seal pressing device 10, constructed and operative in accordance with a non-limiting embodiment of the present invention.

Figure 2:
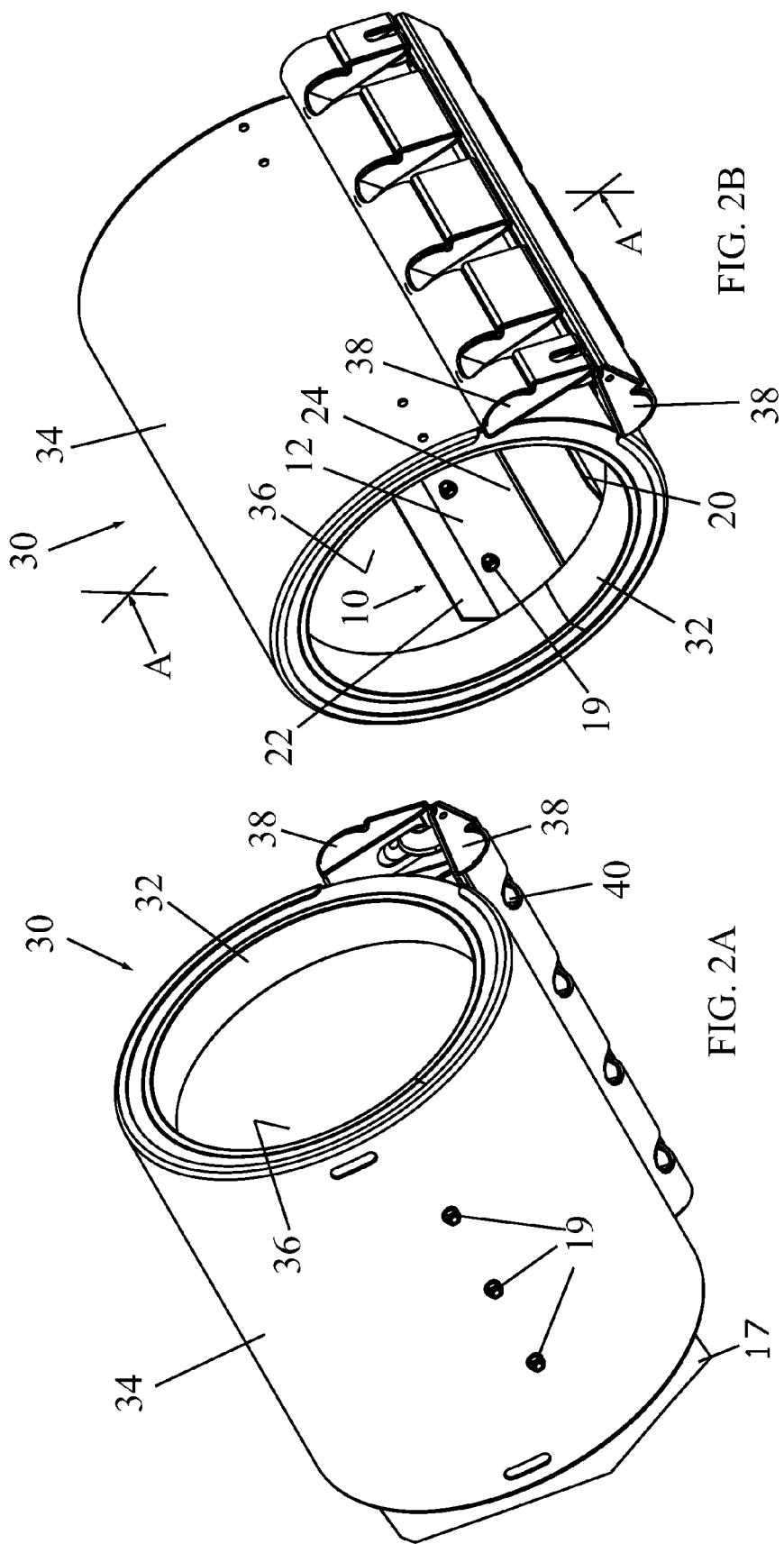
FIGS. 2A and 2B are simplified pictorial illustrations of the seal pressing device of FIG. 1 installed in a pipe coupling, in accordance with a non-limiting embodiment of the present invention.
Figure 3:
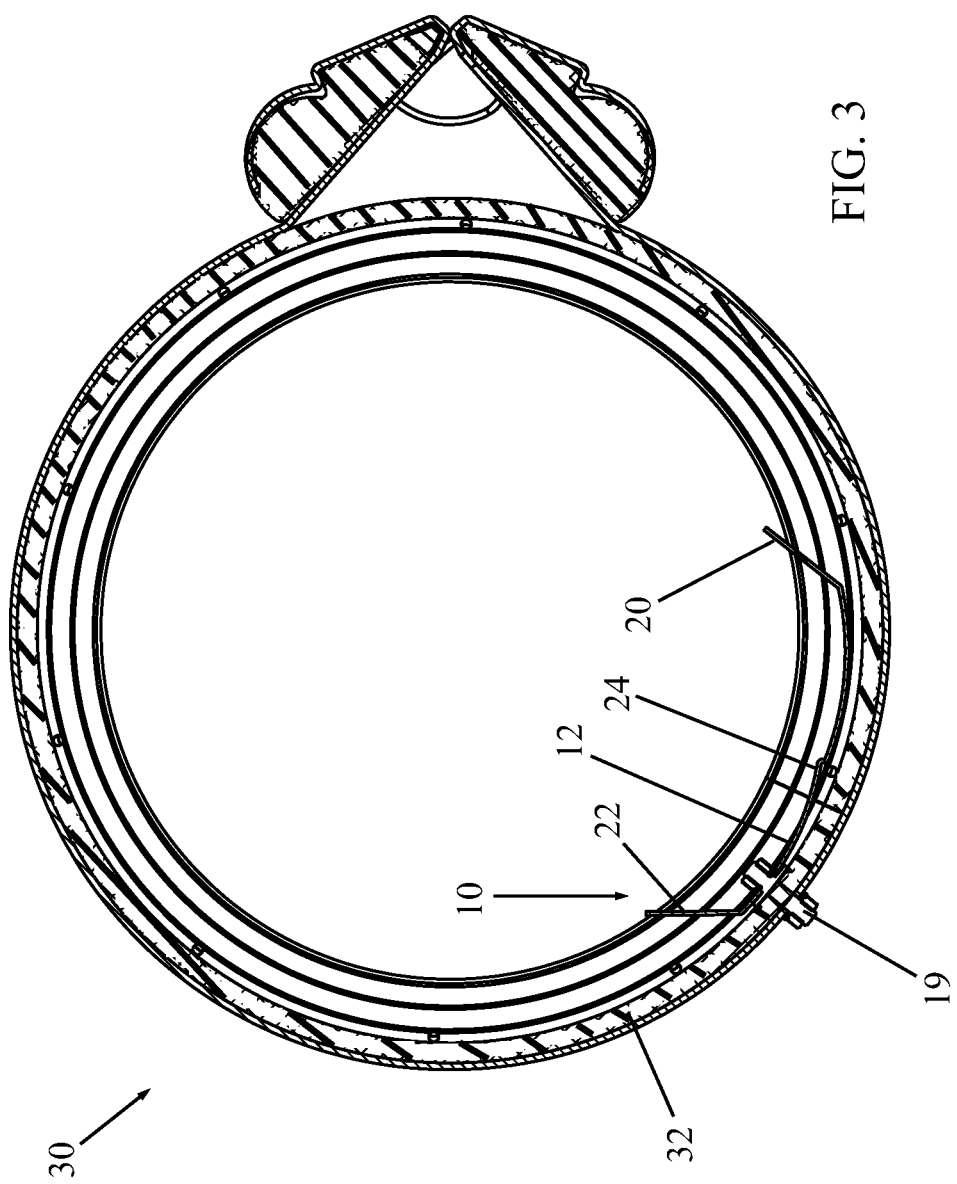
FIG. 3 is a cross-sectional view taken along lines A-A in FIG. 2B.

Seal pressing device 10 includes a sealing member 12 having an axial length along a longitudinal axis 14 and an outer curved contour 16 pressable against an inner diameter of a seal (not shown here but seen in FIGS. 2A-3). Sealing member 12 has an axial row of mounting apertures 18 for receiving therein mechanical fasteners 19 (such as bolts, screws or rivets and the like, not shown here but seen in FIGS. 2A-3). One or more winged extensions 20 (or 22 in the drawing) extend from an end of sealing member 12 bent inwards from the outer curved contour 16 of sealing member 12. In the non-limiting illustrated embodiment, there are two winged extensions 20 and 22 that extend from ends of sealing member 12 on opposite sides of the row of mounting apertures 18. One of the winged extensions 22 is closer to the row of mounting apertures 18 than the other winged extension 20.

In accordance with an embodiment of the present invention an axial crease 24 is parallel to the row of mounting apertures 18. The axial crease 24 is positioned between the row of mounting apertures 18 and winged extension 20.

Reference is now made to FIGS. 2A, 2B and 3, which illustrate the seal pressing device 10 installed in a pipe coupling 30, in accordance with a non-limiting embodiment of the present invention.

Pipe coupling 30 includes an annular seal 32 disposed in an annular clamp housing 34. Annular clamp housing 34 has an opening 36 for inserting therein a pipe (not shown). Annular clamp housing 34 has two clamp members 38 and a tightening element 40 (e.g., one or more mechanical fasteners, such as a bolt or screw and a tightening nut, and possibly washer) that fastens and tightens clamp members 38 towards each other in a direction transverse to the axial length of annular clamp housing 34 so as to apply a radially-inward clamping force on the pipe inserted in opening 36.

Annular seal 32, which may be made of a natural or artificial elastomeric material, is radially squeezed and sealingly clamped against the outside surface of the pipe when tightening element 40 fastens and tightens clamp members 38 towards each other.

The pipe coupling may be of the type described in US Patent Application 20080012339 to the present inventors, filed on 5 Mar. 2007, or in U.S. Pat. No. 7,571,940, issued on 11 Aug. 2009 to the present inventors, the disclosures of which are incorporated herein by reference. The present invention is not limited to these pipe couplings, however.

A pipe inserted in pipe coupling 30 is sealed by annular seal 32. The inserted pipe also presses against the winged extensions 20 and 22 of seal pressing device 10, which in turn press against the axial edges of annular seal 32. The action of seal pressing device 10 pressing against these edges insures a fluid-tight seal along the axial length of seal 32.

Seal pressing device 10 may work satisfactorily in some applications with only one winged extension. However, in some applications, if only one winged extension is used it may cause a turning moment on the mechanical fasteners 19 at the edges of seal 32 and loosen the tightness of the fluid-tight seal. This is solved by using two winged extensions on opposite sides of the fasteners so that one winged extension cancels the turning moment of the other winged extension, and tightness of the fluid-tight seal is maintained.

The scope of the present invention includes both combinations and subcombinations of the features described hereinabove as well as modifications and variations thereof which would occur to a person of skill in the art upon reading the foregoing description and which are not in the prior art.

What is claimed is:

1. A pipe coupling comprising:
   an annular seal disposed in an annular clamp housing, said annular clamp housing having an opening for inserting therein a pipe and comprising clamp members and a tightening element that fastens and tightens said clamp members towards each other in a direction transverse to a longitudinal length of said annular clamp housing so as to apply a radially-inward clamping force on a pipe inserted in said opening;
   a sealing member having a length which is parallel to a length of the pipe coupling, and an outer curved contour that presses against an inner diameter of said seal, said sealing member having a longitudinal row of mounting apertures for receiving therein mechanical fasteners; and
   at least one winged extension extending from an end of said sealing member bent inwards from said outer curved contour of said sealing member, and wherein said outer curved contour comprises a longitudinal crease.

2. The pipe coupling according to claim 1, wherein said longitudinal crease is parallel to the row of mounting apertures.

3. The pipe coupling according to claim 1, wherein said longitudinal crease is positioned between the row of mounting apertures and said at least one winged extension.

4. The pipe coupling according to claim 1, wherein said at least one winged extension comprises two winged extensions extending from ends of said sealing member on opposite sides of the row of mounting apertures.

5. The pipe coupling according to claim 4, wherein one of said winged extensions is closer to the row of mounting apertures than the other winged extension.

\* \* \* \* \*